United States Patent
Coleman et al.

[11] Patent Number: 5,906,846
[45] Date of Patent: May 25, 1999

[54] NOVELTY CANDY HOLDING DEVICE

[76] Inventors: Thomas J. Coleman, 19170 Paddock Pl., Abingdon, Va. 24211; William K. Schlotter, IV, 117 Wateredge La., Fredericksburg, Va. 22406; Princess Ann Coleman, 19170 Paddock Pl., Abingdon, Va. 24211; Ann M. Schlotter, 117 Wateredge La., Fredericksburg, Va. 22406

[21] Appl. No.: 09/094,272

[22] Filed: Jun. 9, 1998

[51] Int. Cl.⁶ .................................................. A23G 3/00
[52] U.S. Cl. .......................... 426/104; 426/132; 446/26; 446/73
[58] Field of Search .................... 426/104, 132, 426/134, 420, 421; 446/26, 27, 73, 71, 374, 386, 475

[56] References Cited

U.S. PATENT DOCUMENTS

| | | | |
|---|---|---|---|
| 423,066 | 2/1890 | Massey | 446/73 |
| 545,698 | 9/1895 | Johnson | 426/104 |
| 2,882,170 | 4/1959 | Stewart | 426/104 |
| 3,099,568 | 7/1963 | Brody et al. | 426/104 |
| 3,138,249 | 6/1964 | Paulini | 446/71 |
| 4,078,330 | 3/1978 | Roth | 446/26 |
| 4,333,974 | 6/1982 | Davis | 446/386 |
| 5,385,500 | 1/1995 | Schmidt | 446/374 |

FOREIGN PATENT DOCUMENTS

| | | | |
|---|---|---|---|
| 6972 | of 1885 | United Kingdom | 426/104 |

OTHER PUBLICATIONS

Tarco Quality Toy Advertisement for "Dolly the Bubble Gum Dachshund", Mar. 1965.

*Primary Examiner*—David Lacey
*Assistant Examiner*—Sherry Dauerman
*Attorney, Agent, or Firm*—Melvin L. Crane, Agent

[57] ABSTRACT

A candy or gum holding device including an elongated flexible cord. The candy or gum is of a gummy type which can be threaded onto the cord along its length. Near a lower end of the cord, the cord is flared slightly so that the candy or gum pieces will not fall off but can be pulled off over the flare. The upper end of the cord is provided with a head and the lower end of the cord is provided with a tail section. The head is provided with an aperture which receives the end of the tail section in order to form a bracelet or anklet after the candy has been consumed.

6 Claims, 1 Drawing Sheet

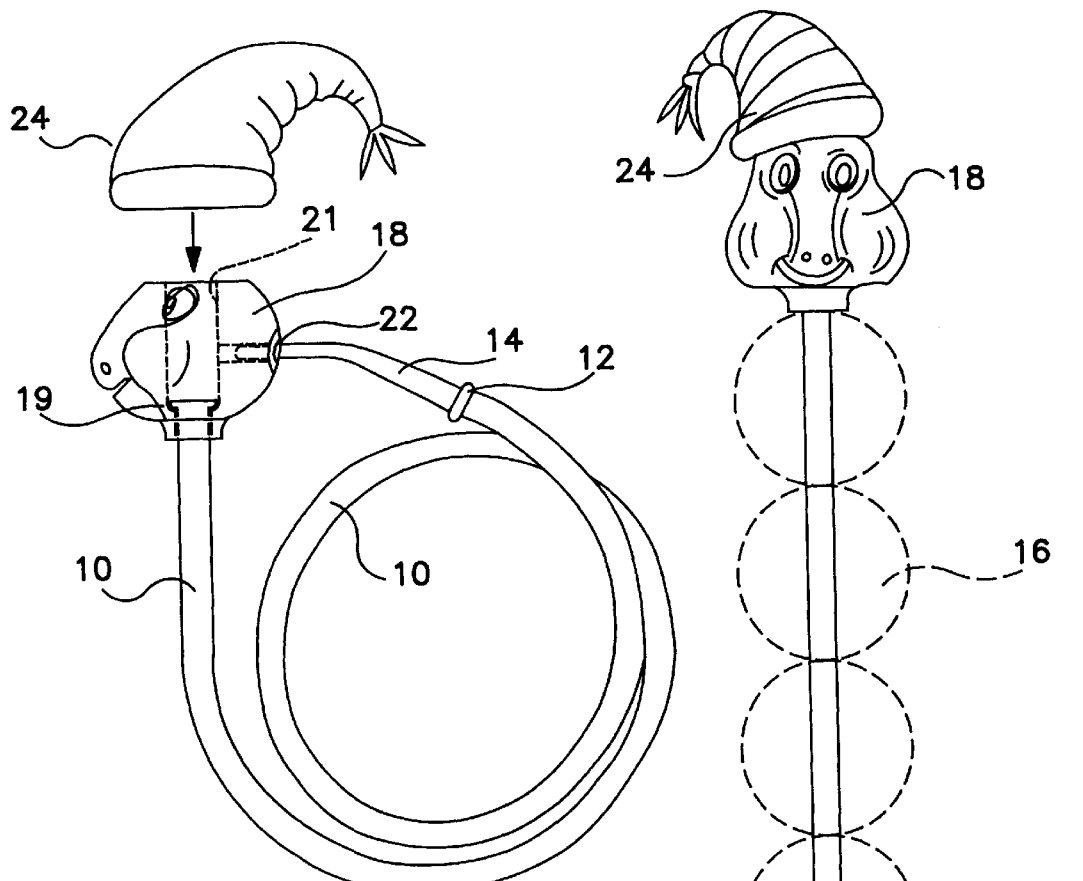
FIG. 1
FIG. 2
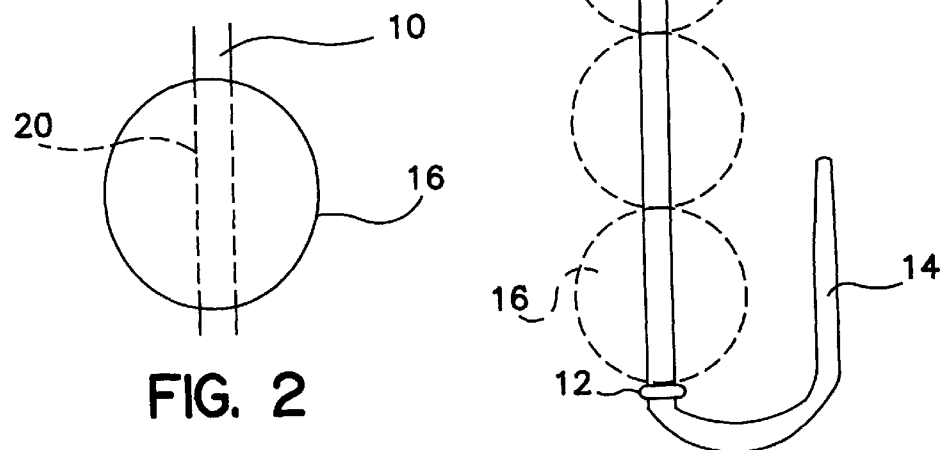
FIG. 3

NOVELTY CANDY HOLDING DEVICE

This invention is directed to a novelty candy holding device and more particularly to a novelty candy holding device which has an added use.

BACKGROUND OF THE INVENTION

It is well known that candy has been packaged in many different ways such as small boxes, large boxes, long pieces from which small pieces are broken off, as well as many other packages.

SUMMARY AND OBJECTS OF THE INVENTION

This invention makes use of a bendable material in the form of a cord. Pieces of candy, such as a gummy type, are fitted onto the cord and are removed as desired for consumption. Once the candy has been removed, the cord can be wrapped around one's wrist or leg for use as a decorative bracelet.

It is therefore an object to provide a candy holding device in the form of a bendable material from which the candy is removed for consumption.

Another object is to provide a candy holding means which can be used as a bracelet once the candy has been consumed.

Still another object is to provide a candy holding means from which the candy can be removed and the holding means is provided with an enclosing head and tail which are used to form a bracelet or some other device.

Other objects and benefits of the invention will become obvious to those skilled in the art from a review of the following description and drawings.

BRIEF DESCRIPTION OF THE DRAWINGS

FIG. 1 illustrates the candy holding device after the candy has been removed and the candy holder formed into a bracelet;

FIG. 2 illustrates a piece of gummy candy with the cord passing therethrough; and FIG. 3 illustrates the candy holder in a straight line with candy pieces shown by dotted lines.

DETAILED DESCRIPTION

Now referring to the drawings, there is shown a candy holding means such as a bendable cord 10 which is flared 12 near one end to keep the candy from falling off the cord. The flare is near one end which leaves a short piece 14 beyond the flare. The number of candy pieces 16 on the cord depends on the size of the candy pieces and the length of the cord. The upper end of the cord is provided with a small flare 19 and an aperture 21 through which the flare 19 can pass. The upper end of the cord is provided with a plastic or rubber head 18 or some other design which prevents the candy from falling off the upper end of the cord. The head is provided with an aperture 22 in the back side which will be further described later. Since the candy is held on the cords it is obvious that the candy pieces have an aperture 20 preferably through the center through which the cord extends.

In assembly, the cord is made with a flared end 12 and the candy pieces are added from the opposite end of the cord and moved downward to the flared end. Once the cord has been filled with candy pieces, the head is secured to the cord. The candy is removed from the cord by pulling the candy piece-by-piece over the flared end. It is therefore obvious that the flare is only large enough to prevent the candy from falling off so that the candy can be easily removed over the flare.

Once the candy has been removed and/or consumed, the bendable cord can be wrapped around the consumer's wrist or ankle and the end of the short piece below the flare is inserted into the aperture in the back of the head in order to hold the bent cord on the wrist or ankle (as shown in FIG. 1). The head can be made in different forms, human, animal, or some creature form. The head may be provided with hair and/or a covering 24 of some kind to add to the novelty of the device.

The candy pieces need not be round but could be made into any desired form of an animal or some creature. The important feature is that the candy is of a type which can be removed over the flared end such as a gummy type. The term candy has been used for the pieces on the cord. One could also add pieces of gum or any other edible pieces on the cord.

Since the short end of the cord is to be inserted to the aperture in the back of the head piece, the end should be somewhat conical for use of insertion. Obviously the short end piece should be of a size that it will be held in the apertures.

The device provides a novelty gum/candy holding device to hold gummy candy on a bendable cord. Once the gummy candy has been removed and consumed, the bendable cord can be formed into a decorative bracelet to be worn on the user's wrist or ankle. Since the cord is to form a bracelet, the cord can be of different colors and designs to be more amusing.

The foregoing relates to preferred exemplary embodiments of the invention, it being understood that other variants and embodiments thereof are possible within the spirit and scope of the invention, the latter being defined by the appended claims.

We claim:

1. A combination edible product holding device and edible product which comprises:

an elongated main body, a plurality of pieces of an edible product on said main body, means for preventing the edible product from falling off one end which is positioned near said one end of said main body, means for preventing the edible product from falling off another end of said main body is positioned on said another end of said main body, said means for preventing on another end of said main body is in the shape of a head of a human, an animal, or any desired character, said head includes an aperture on the back side thereof which is constructed to receive the lower end of said main body.

2. An edible product holding device as set forth in claim 1, in which said elongated main body is a bendable cord.

3. An edible product holding device as set forth in claim 2, in which said edible product is a gummy, candy or gum.

4. An edible product holding device as set forth in claim 3, in which said cord is bendable into a bracelet and wrapped around one's wrist or ankle once the gummy candy or gum has been removed.

5. An edible product holding device as set forth in claim 3, in which said head is made of rubber or plastic of any desired form.

6. A combination of gummy candy holding device and gummy candy comprising:

a bendable elongated cord, said cord including a flare near one end thereof, a plurality of pieces of gummy candy on said cord extending from said flare to near another end of said cord, a plastic or rubber head secured to said another end of said cord, said head has the configuration of any desired shape, said head includes an aperture on the back side thereof which is constructed so as to receive said other end of said cord to form a circular bracelet.

\* \* \* \* \*